United States Patent [19]
Tolman

[11] 3,793,617
[45] Feb. 19, 1974

[54] ULTRASONIC AREA SURVEILLANCE SYSTEM

[75] Inventor: John Leonard Tolman, Northglenn, Colo.

[73] Assignee: Bruce G. Klaas, Denver, Colo.

[22] Filed: June 26, 1972

[21] Appl. No.: 266,221

[52] U.S. Cl............... 340/1 R, 340/3 D, 340/258 A, 343/5 PD
[51] Int. Cl........................................... G08b 13/16
[58] Field of Search...... 340/1 R, 3 D, 16 R, 258 A; 343/5 PD

[56] References Cited
UNITED STATES PATENTS
3,383,678   5/1968   Palmer.............................. 343/5 PD
3,697,989   10/1972  Bailey et al...................... 343/5 PD

*Primary Examiner*—Richard A. Farley
*Attorney, Agent, or Firm*—Bruce G. Klaas

[57] ABSTRACT

There is herein disclosed an ultrasonic surveillance system comprising transmitter means to establish constant frequency ultrasonic signals in an area under surveillance, receiver means to receive reflected ultrasonic signals and produce an AC control signal proportional to changes in the reflected ultrasonic signals caused by changes in the area under surveillance, amplifier means to amplify the AC control signal, rectifier means to change the AC control signal to a proportional DC control signal, level change detector means to detect changes in level of the DC control signal and provide a DC alarm condition signal proportional to changes in level of the DC control signal, tuned amplifier means to amplify the DC alarm condition control signals within a predetermined range, and signal duration responsive means and signal intensity responsive means operable to pass the alarm condition signal to alarm operating means only when the alarm condition signal is of predetermined duration and intensity.

15 Claims, 3 Drawing Figures

ULTRASONIC AREA SURVEILLANCE SYSTEM

BACKGROUND AND SUMMARY OF INVENTION

The general concept of an ultrasonic area surveillance system is well known in the prior art. Indeed, a multitude of patents have been granted on such systems and the problems encountered with attempts to monitor small areas, such as rooms or corridors of houses and office buildings, are well documented in the prior art, examples of which are U.S. Pats. No. 2,903,683, No. 3,383,678, and No. 3,569,924. Suffice it to say herein, that extreme sensitivity and/or extreme cost of prior art systems have largely precluded commercial acceptance in any large measure.

The present invention involves the provision of a closely controlled transmitter providing constant frequency ultrasonic output signals and measurement of changes in reflected ultrasonic signals within an area under surveillance in a new and improved manner giving a much higher degree of reliability than with prior art systems. In general, the measurement of changes involves obtaining a DC alarm condition signal only when there are changes in the reflected ultrasonic signals and then utilizing the DC alarm condition signal to actuate an alarm only when the signal is within a predetermined frequency range and has both a predetermined duration and intensity.

DETAILED DESCRIPTION

In General

Figure 1:
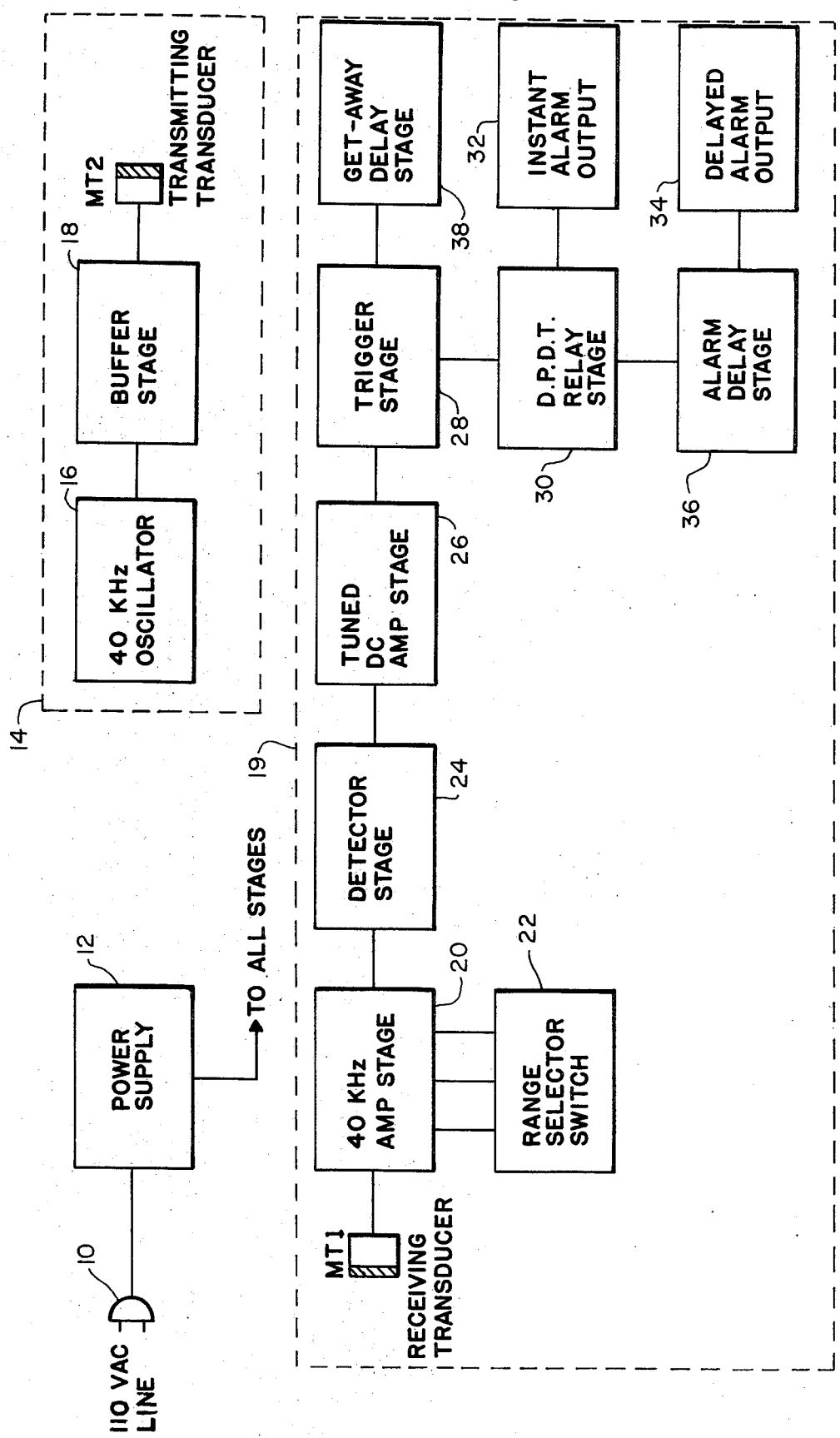
FIG. 1 is a block diagram of an illustrative embodiment of the invention.

Referring now to FIG. 1, the ultrasonic intruder detector system of the present invention comprises a source 10 of 110 volt alternating current (AC) and a direct current (DC) power supply source 12. A source 14 of ultrasonic signals to be transmitted into a space to be monitored at a fixed frequency includes oscillator circuit means 16, buffer stage circuit means 18, and conventional transmitter transducer means MT2. Detection and alarm means 19 for detecting movement or the like in the space by changes in patterns of reflected ultrasonic signals includes a conventional reflected ultrasonic signal receiving transducer MT1 providing an AC control signal having an amplitude proportional to changes in the reflected ultrasonic signals. An amplification stage circuit means 20 amplifies the AC control signals from the receiving transducer MT2 and, through a selector switch means 22, enabling selective transfer of amplified AC control signals from only close range or including long range, transmits an amplified AC control signal to detector stage circuit means 24 which provides a DC alarm condition signal (i.e., a signal indicative of a change in the reflected ultrasonic signals caused, for example, by movement within the area under surveillance) proportional to the amplified AC control signal from the receiving transducer. A tuned DC amplifier stage means 26 provides an amplified DC alarm condition signal within a predetermined frequency range by eliminating high and low frequencies. Only alarm condition signals of predetermined duration and intensity are recognized by trigger stage circuit means 28 to actuate conventional control relay stage means 30 and one or more conventional instant alarm output means 32, or one or more conventional delayed alarm output means 34 through a delay stage circuit means 36. A get-away delay stage circuit means 38 is associated with the trigger stage circuit means to enable the detector system to be turned on by an operator within the area under surveillance without triggering the alarm. The system components are mounted in a single housing 40 of relatively small size (e.g. 3 × 12 × 7 inches) with the transmitting transducer and the receiving transducer mounted in spaced relationship along one side of the housing.

In the following detailed description, the conventional abbreviations used for the conventional electrical components are as follows: MT is for transducer type devices, Q is for transistor devices, C is for capacitor type devices, V is for volt, R is for resistor type devices, CR is for diode type devices, B+ is for positive DC line voltage, GRD is for ground, T is for transformer devices, VR is for Zener diode devices, L is for inductor devices, E is for input and output terminals in the circuitry and housing, KHZ is for kilohertz, A is for bridge rectifier devices, J is for receptacle devices, P is for plug devices.

Power Supply

Figure 2:
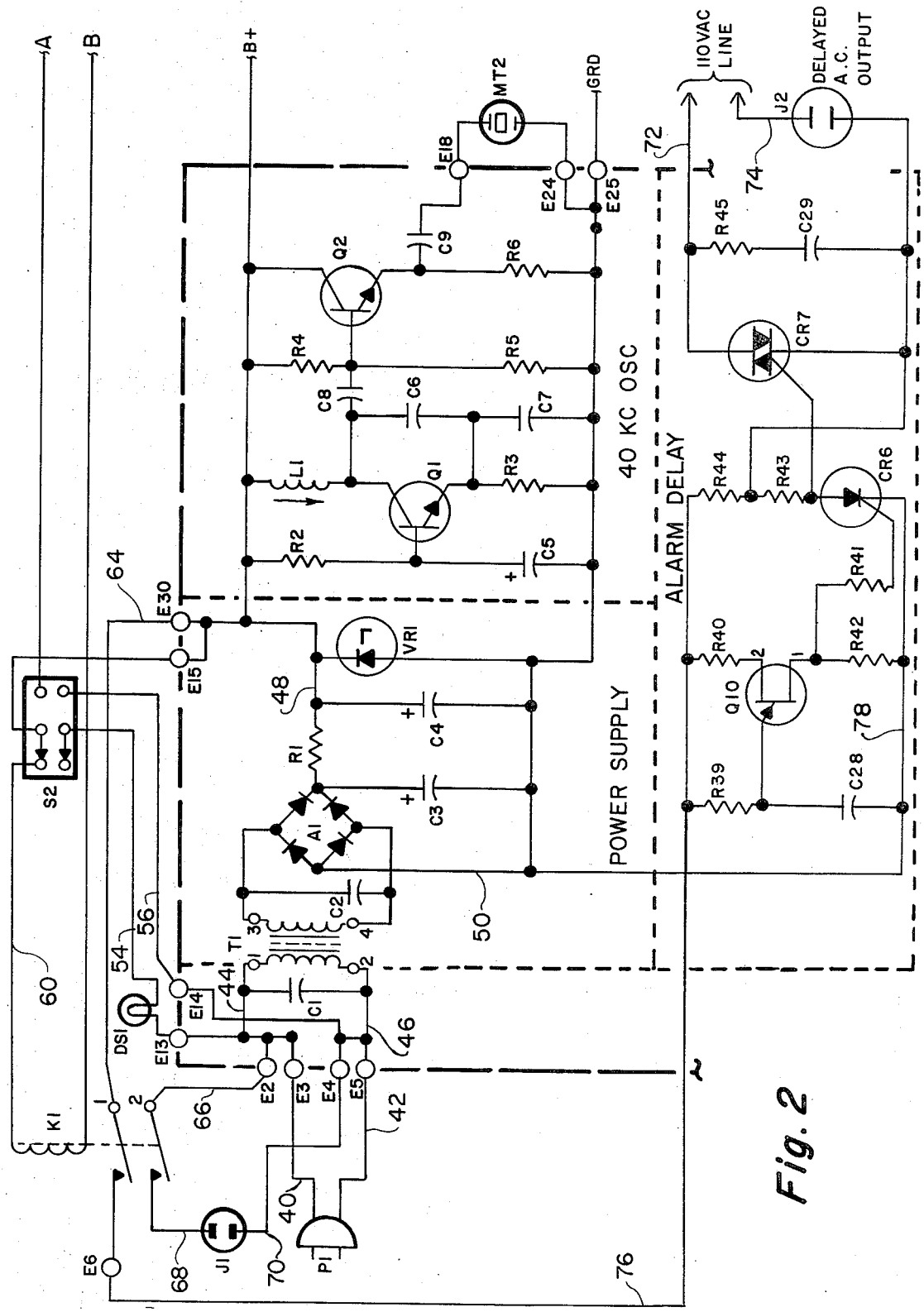
FIG. 2 is a circuit diagram of a portion of the system.

Referring to FIG. 2, a power supply means provides 24 volts DC constant current (CC) for operation of the detector system. In the illustrative embodiment of the invention the power supply means is in the form of a conventional step down transformer T1, a conventional bridge rectifier A1, a Zener diode type voltage regulator VR1, and related circuitry. The detection system is designed to be operable by a source of 110 volt, 60 cycle alternating current, as found in most homes and offices, connected to the power supply circuitry by a plug P1, lines 40, 42, terminals E3, E5, and lines 44, 46 connected to transformer terminals 1, 2 with a filter capacitor C1 connected thereacross to reduce high frequency noise. Transformer terminals 3, 4 of the 35 volt AC secondary winding are connected to the bridge rectifier across a filtering capacitor C2 which further reduces high frequency noise. The bridge rectifier provides a rectified 24 volt DC current on line 48 and is grounded by line 50. A PI type filter network, including resistor R1 and capacitors C3, C4, eliminates 60 HZ and 120 HZ ripple. Voltage regulator VR1 provides a constant current DC voltage on line B+ for the detector system circuitry at all times when plug P1 is connected to the AC power source. If desired, battery power may be provided as an additional feature of the system.

Transmitter Circuitry

Referring to FIG. 2, 40 kilocycle ultrasonic signal transmitting means are continuously connected to the 24 volt power supply to provide a continuous surveillance signal in the area to be protected. In the illustrative embodiment, the transmitting means comprises a Class A type operating oscillator transistor Q1, an adjustable LC circuit (to obtain a precise 40 KHZ output) including adjustable inductor L1 and capacitor C6, a Class A type operating buffer transistor Q2, a conventional ultrasonic signal sending transducer MT2, and related circuitry. The base of transistor Q1 is connected to 24 volts DC through biasing resistor R2 and to ground through a capacitor C5. The emitter is RC coupled to ground through a resistor R3 and a capacitor C7. The collector is connected to 24 volts DC through inductor L1, which is adjustable to provide an exact 40 KHZ output, connected to the base of transistor Q2 through capacitor C8. The Q2 base is connected to 24 volts CC through biasing resistor R4 and to ground through biasing resistor R5. The Q2 collector is directly connected to 24 volts DC and the Q2 emitter is connected to ground through a resistor R6 to increase the power of the 40 KHZ signal which is coupled to the ultrasonic signal sending transducer MT2 through capacitor C9 and terminal E18 and grounded through terminals E24, E25. Thus, at all times when the detection system is plugged in to the AC power supply, a constant frequency 40 KHZ ultrasonic output signal is sent into the space opposite the transducer MT2. Portions of the ultrasonic output signal will be reflected back toward the detector unit from objects within and walls defining the space opposite the sending transducer.

The Detection System On-Off Circuitry

Referring to FIG. 2, on-off type control means are provided for the detection system and in the illustrative embodiment of the invention, the control means comprises a manually operable on-off switch S2 which is connected to 24 volt DC through terminal E15 and a line 52. The switch is also connected across the AC input through terminals E13, E14 by lines 54, 56, which include a lamp DS1 energized when the switch is in the off position (not shown) to warn the operator that the detection system is inoperative. In the off position of the switch, the 24 volt DC lines 52 is connected to line A for a purpose to be hereinafter described. In the "on" position of the switch, the 24 volt DC line 52 is connected to the coil of a relay K1 for a purpose to be hereinafter described, while being disconnected from line A, and lamp DS1 is disconnected to indicate that the detection system is operable.

RECEIVER TRANSDUCER

Figure 3:
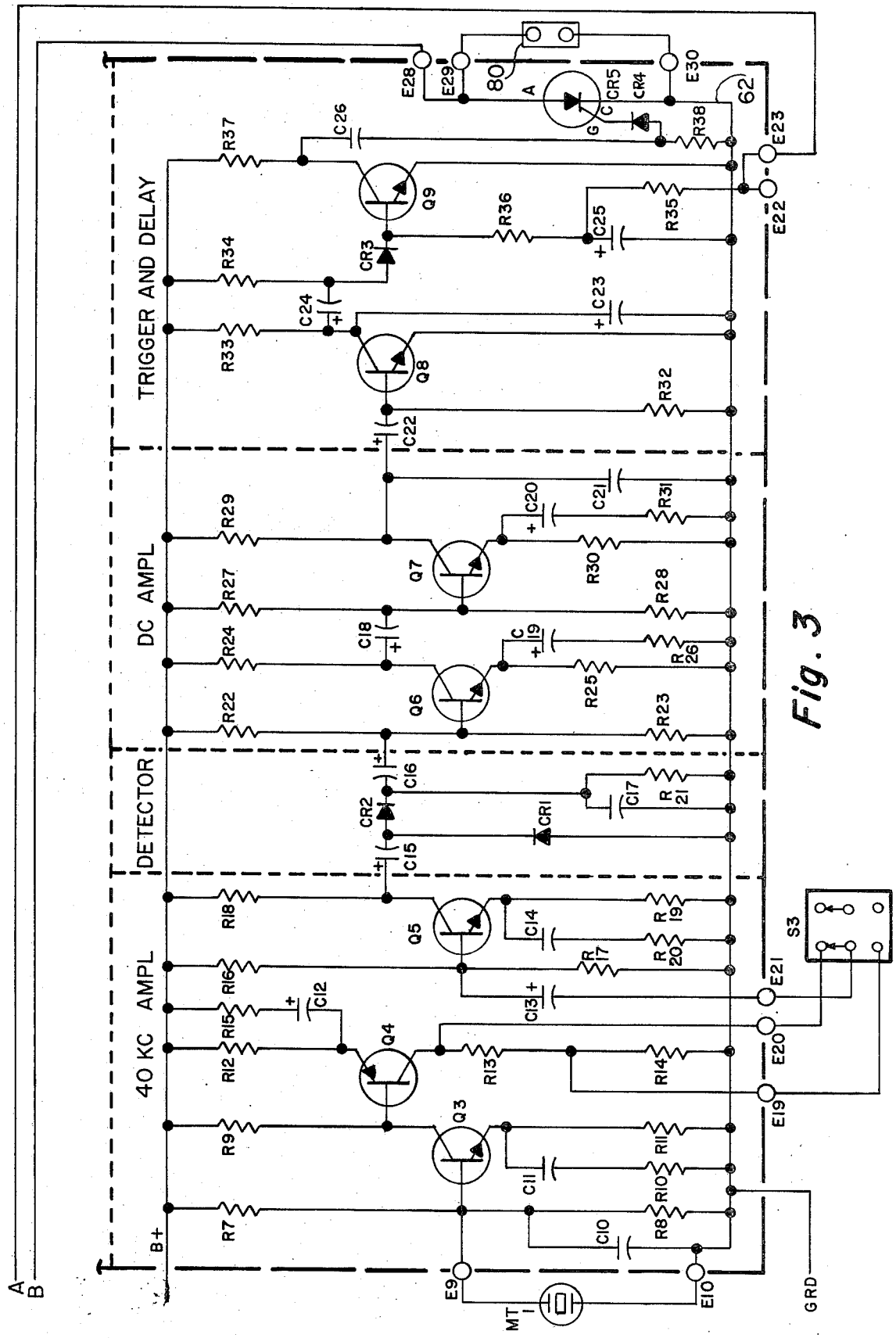
FIG. 3 is a circuit diagram of another portion of the system.

Referring to FIG. 3, the receiver transducer MT1 is of conventional design and connected to the amplifcation stage by terminals E9, E10 to provide a control signal which will be constant when there are no changes in the area under surveillance and which will vary when there are changes caused, for example, by movement in the area. An RC filter network is provided by resistor R8 and capacitor C10 to remove any residual 40 kilohertz AC signal from the DC bias voltage so that the AC control signal derived from transducer MT1 will vary only in accordance with variations in the reflected ultrasonic signals.

RECEIVER TRANSDUCER SIGNAL AMPLIFICATION STAGE

Referring now to FIG. 3, the detector system comprises control signal amplification means to amplify the AC control signal derived from the receiver transducer and detection range control means to enable manual selection of different distances of surveillance.

In the illustrative embodiment, the amplification means is in the form of three transistors Q3, Q4, Q5 and related circuitry. Transistor Q3 is of Class A type operation with the base connection to 24 volts DC through biasing resistor R7 and to ground through biasing resistor R8. The collector is connected to 24 volts DC through resistor R9 to provide for suitable voltage amplification. The emitter is connected to ground through biasing resistor R11 and an RC filter network including resistor R10 and capacitor C11 by which greater amplification of the high frequency control signal is enabled.

The amplified output of transistor Q3 is directly connected to the base of transistor Q4 which is also of Class A type operation. The emitter is connected to plus 24 volts DC through a biasing resistor R12 and an RC network including resistor R15 and capacitor C12 which again facilitates amplification of the high frequency control signal. The collector is grounded through resistors R13, R14 which provide the desired voltage amplification.

In order to provide a manual range selection of distance of surveillance, the collector of transistor Q4 may be selectively directly connected to a coupling capacitor C13 through terminals E20, E21 and manually operable switch S3, or connected to the coupling capacitor C13 through resitor R13, terminals E19, E21, and switch S3. Thus, the gain provided by transistor Q4 will depend on the position of switch S3 so that with less gain the detector system will be effective over a shorter distance and with more gain the detector system will be effective over a longer distance.

The amplified output of transistor Q4 is capacitively coupled to the base of transistor Q5, which is of Class A type operation, with the base connected to 24 volts DC through biasing resistor R16 and grounded through biasing resistor R17. The emitter is grounded through biasing resistor R19 and an RC filter network including resistor R20 and capacitor C14. The collector is connected to 24 volts DC through biasing resistor R18 to provide the final amplification of the AC control signal.

Alarm Condition Detector Stage

Referring to FIG. 3, the detector system comprises alarm condition detector means to change the amplified AC control signal derived from the receiver transducer and the amplification stage to a directly proportional AC voltage level which will vary in accordance with alarm conditions in the space under surveillance. In the illustrative embodiment of the invention, this means is in the form of a diode rectifier comprising diodes CR1 and CR2 connected to the collector of amplification transistor Q5 by capacitor C15. An RC filter network of resistor R21 and capacitor C17 filters 40 KHZ ripple from the normally constant DC voltage output of the diode rectifier which is normally blocked by a capacitor 16 unless and until there is a variation of the DC voltage level which will be a directly proportional reflection of variations in amplitude of the receiver transducer control signal. The variations in the DC voltage level appearing at the positive terminal of capacitor C16 may be used as a measure of alarm conditions in the space under surveillance and may be utilized to provide a positive indication of an alarm condition. The arrangement is such as to provide a DC alarm condition signal whenever the control signal varies from that normally provided by the reflected ultrasonic signals.

Tuned DC Amplifier Stage

Referring to FIG. 3, the detector system comprises an alarm condition signal amplification means in the form of a pair of AC coupled Class A type operation transistors Q6, Q7 and related circuitry. The bases of each transistor are connected to 24 volts DC through resistors R22, R27, respectively, and to ground through resistors R23, R28, respectively. The emitter of each transistor is grounded through resistors R25, R30, respectively, and connected to an RC filter network comprising resistors R26, R31, and capacitors C19, C20, respectively. Any variations of DC voltage level at the positive terminal of coupling capacitor C16, are applied to the base of first amplification stage transistor Q6 and the filter network R26, C19 permits passage of high frequencies while filtering out predetermined low frequenceis below, for example, 40 cycles per second. The output of transistor Q6 is coupled to the base of transistor Q7 by a capacitor C18 which further filters out low frequencies while more readily passing high frequencies. The filter network R31, C20 of transistor Q7 functions in a similar manner to filter network R26, C19 of transistor Q6. Thus, a low frequency range filter means is provided by R26, C19, and C18 and R31, C20 at levels below approximately 40HZ. The collector of transistor Q7 is connected to ground through a capacitor C21, so as to remove high frequencies in excess of, for example, approximately 180 cycles per second, and the filtered amplified output of the amplification means is coupled to the trigger stage through capacitor C22 to provide an amplified DC alarm condition signal within the predetermined frequency range which eliminates certain false alarm signal which may occur in the higher and lower frequency ranges.

Trigger Stage

Referring to FIG. 3, the detector system includes alarm actuation means responsive only to an amplified alarm condition signal having both a duration and a magnitude indicative of a true alarm condition and not a false alarm condition. In the presently preferred embodiment of the invention, this alarm actuation means is in the form of a transistor Q8 which determines the sufficiency of the duration of the signal, a transistor Q9 which determines the sufficiency of the magnitude (amplitude) of the signal, an SCR device CR5, which connects 24 volts DC to ground through line B and terminal E28 to operate relay K1, when activated by transistors Q8, Q9, and related circuitry.

Transistor Q8 is of Class C type operation, normally off, with the base connected to ground through resistor R32, the emitter connected directly to ground, and the collector, with a normally relatively high voltage level, connected to 24 volts DC through resistor R33. Whenever an alarm condition signal from amplifier transistor Q7 of the amplification stage is of sufficient amplitude, e.g., 0.5 volts in the illustrative circuit, transistor Q8 will be turned on to permit current flow through the emitter to the collector with resistor R33 tending to cause a voltage drop at the collector. However, capacitor C23, which is normally charged to the same potential as the collector, will discharge to the collector to maintain the collector voltage for a predetermined relative short time interval for the purpose of eliminating any high frequency noise spike type signal. When the collector voltage does drop, the output of transistor Q8 is coupled to transistor Q9 through capacitor C24.

The base of transistor Q9 is connected to 24 volts DC through diode CR3 and resistor R34 with the emitter directly grounded so as to be normally biased "on" and the collector at a relatively low voltage potential. The appaerance of a negative signal through capacitor C24 will momentarily turn "off" the transistor Q9 by causing a current flow from the base resulting in an increase in collector voltage which is coupled through capacitor C26 to cause a change in voltage across resistor R38. Whenever the voltage change is sufficient, as applied through diode CR4 and the SCR gate, the SCR device CR5 will be activated to connect the coil of relay K1 to ground.

Get Away Delay Stage

Referring now to FIGS. 2 and 3, the detector system includes means to prevent actuation of the alarm stages until elapse of a predetermindd time interval, such as 30 seconds, sufficient to enable the switch S2 to be manually moved from the "off" position to the "on" position and the operator to thereafter vacate the detection zone. In the presently preferred form of the invention, this means comprises a capacitor C25, having its positive terminal connected to the 24 volts DC power source through a resistor R35, terminal E23, line A, switch S2 in the "off" position (not shown), line 52, and terminal E15. When switch S2 is in the "off" position, capacitor C25 is charged and current flows through resistor R36 to saturate transistor Q9 to prevent any change in current level therein and thereby prevent any output signal therethrough. When switch S2 is moved to the "on" position, capacitor C25 will discharge to the base of transistor Q9 to continue to prevent any output signal for a predetermined time interval which provides the get away delay time.

Relay Stage

Referring to FIG. 2, the detector system includes means to activate the instant alarm stage and the delayed alarm stage. This means is in the form of a relay K1 with one side of the coil connected to the 24 volts DC power source by line 60, switch S2, line 52, and terminal E15 and with the other side of the coil grounded through the SCR device CR5, FIG. 3, by line B, terminal E28, and line 62 to energize the instant alarm stage 32 and the alarm delay stage 36. Relay terminal 1 is connected by line 64 to the 24 volts DC power source through terminal E30 and relay terminal 2 is connected by line 66 to one side of the 110 volt AC source through terminal E2.

Instant Alarm Stage

Referring to FIG. 2, the detector system includes means, in the form of a receptacle J1 connected across the 110 volt AC source through terminals E2, E4 by a line 68, a line 70, and contact 2 of relay K1, to provide an instant AC alarm output signal, which may be used to sound an alarm at the site or at a remote location, immediately after energization of relay K1 through SCR device CR5. In addition, other detector systems, such as pressure sensitive devices or heat sensitive devices, may be connected to the ultrasonic detection system through a terminal strip 80, FIG. 3, connected around the SCR device by terminals E29, E30.

Delayed Alarm Stage

Referring to FIG. 3, the detector system includes means, in the form of a receptacle J2 connected across the 110 volt AC source by lines 72, 74 a predetermined time interval after energization of relay K1 as determined by a unijunction transistor Q10, an SCR device CR6, a triac device CR7, and related circuitry, to provide a delayed AC alarm actuating output signal a predetermined time interval after energization of relay K1 through SCR device CR5. The related circuitry comprises 24 volt DC input line 76 and ground line 78. A timing circuit, set for approximately 20 second delay, includes a resistor R39 and a capacitor C28 connected to transistor Q10 biased by resistor R40 and grounded through resistor R42. Transistor Q10 is connected through resistor R41, to the gate of the SCR device CR6 which, upon energization, causes energization of CR7 due to the voltage drop across resistors R43, R44. Current will then flow through CR7 with resistor R45 and capacitor C29 providing a filtering network to eliminate noise interference from the 110 volt AC source. The delayed output signal at receptacle J2 may be used to actuate a conventional alarm device at the site or at a remote location as is well known in the art.

I claim:
1. An alarm system comprising:
   power means for supplying AC power for operation of said system,
   a DC power supply network connected to said power means to provide a DC power supply of predetermined relative constant voltage,
   signal sending transducer means connected to said DC power supply network and being operative to provide a predetermined output signal level in a given area,
   signal receiving transducer means connected to said DC power supply network to provide an AC control signal proportional to the output signal as varied by changes in conditions within the given area,
   AC control signal amplification means connected to said signal receiving transducer means and said DC power supply network to provide an amplified AC control signal,
   control signal variation detection means connected to said AC control signal amplification means and providing a variable DC alarm condition signal proportional only to predetermined variations in the AC control signal level,
   tuned DC amplifier means connected to said control signal variation detection means to provide an amplified alarm condition signal having frequencies within a predetermined frequency range, and
   alarm operating means connected to said tuned DC amplifier means and being responsive only to amplified alarm condition signals of predetermined duration and intensity to provide an alarm actuating output signal.
2. The invention as defined in claim 1 and wherein said DC power supply network comprising:
   a first filter means connected to said AC power means to filter large voltage variations,
   a transformer connected to said first filter means to provide a reduced AC power output, and
   a second filter means connected to said transformer to provide a filtered AC power output.
3. The invention as defined in claim 2 and wherein said DC power supply network comprises:
   a bridge rectifier circuit connected to said transformer means,
   a filter network connected to said bridge rectifier circuit, and
   voltage regulator means connected to said filter network to provide a relatively constant voltage DC power supply.
4. The invention as defined in claim 3 and wherein said signal sending transducer means comprising:
   an adjustable oscillator means connected to said DC power supply network and providing a constant high frequency AC output signal to operate said sending transducer means at a predetermined relatively constant frequency.
5. The invention as defined in claim 1 and wherein said AC control signal amplification means comprises:
   a first preamplification circuit means connected to said signal receiving transducer means and providing a first amplified AC control signal, and
   a second preamplification circuit means connected to said first preamplification means and providing a second amplified AC control signal.
6. The invention as defined in claim 5 and having AC control signal selection means connected to said second preamplification circuit means to selectively transmit AC control signals of preselected magnitude.
7. The invention as defined in claim 6 and wherein said AC control signal selection means comprising:
   a plurality of signal transmitting circuits of varying resistance connected in parallel, and
   manually operable switch means connected between said signal transmitting circuits and said second preamplification circuit means to selectively transmit only AC control signals of preselected magnitude.
8. The invention as defined in claim 6 and having a third AC control signal amplification means connected to said second AC control signal amplification means through said AC control signal selection means.
9. The invention as defined in claim 8 and wherein said control signal variation detection means comprises:
   rectifier means connected to said third AC control signal amplification means to change said AC control signal to a DC control signal having a level proportional to variations in said AC control signal, and
   DC level detection means connected to said rectifier means and being operative to provide a variable DC alarm condition signal only in response to variations in level of said DC control signal beyond the normal level caused by unchanged output signals received by said signal receiving transducer means.
10. An ultrasonic detector system comprising:
    transmitter means for producing ultrasonic signals of predetermined constant frequency within an area under surveillance,
    DC power means for operating said system,
    receiver means for receiving reflected ultrasonic signals and producing an AC control signal normally constant when there are no changes in the area under surveillance and proportional to changes in said ultrasonic signals resulting from changes in the area under surveillance, amplifier means connected to said receiver means for increasing the strength of said AC control signal, rectifier means connected to said amplifier means for producing a DC control signal directly proportional to said AC control signal and normally at a constant level when there are no changes in the AC control signal and changing levels in direct proportion to changes in the AC control signal caused by changes in the area under surveillance, DC control signal level change detector means connected to said rectifier means and being operative to provide a DC alarm condition signal only in response to changes in level of said DC control signal caused by changes in said reflected ultrasonic signals and in said AC control signal, a tuned DC amplifier means connected to said detector means to amplify only DC alarm condition signals within a predetermined frequency range representing changes in the reflected ultrasonic signals of a predetermined magnitude to eliminate false alarm condition signals beyond said range, first alarm enabling means receiving DC alarm condition signals from said tuned DC amplifier means and being operative by only alarm condition signals of predetermined duration and inoperative in response to alarm condition signals of lesser duration representing a false alarm condition, second alarm enabling means receiving AC alarm control signals from said tuned DC amplifier means and being operative by only alarm condition signals of predetermined intensity and inoperative in response to alarm condition signals of lesser intensity representing a false alarm condition, and alarm operating means receiving DC alarm condition signals within the predetermined frequency range as determined by said tuned DC amplifier means and of predetermined duration as determined by said first alarm enabling means and of predetermined intensity as determined by said second alarm enabling means and being operative thereby to provide an alarm condition output.

11. The invention as defined in claim 10 and having manually operable range selector means to vary the area under surveillance.

12. The invention as defined in claim 11 and wherein said manually operable range selector means comprises a manually operable switch associated with said AC control signal amplifier means and being operative to eliminate AC control signals of less than a predetermined maximum intensity whereby AC control signals of lesser intensity due to an increase in distance of travel of the reflected ultrasonic signals are eliminated.

13. The invention as defined in claim 10 wherein said transmitter means comprises:

DC power supply means providing a DC output, filter means receiving said DC output and providing a filtered DC output, voltage regulator means receiving said filtered DC output and providing a constant filtered DC output, and adjustable oscillator means operable by said constant filtered DC output and connected to said transmitter means to provide the predetermined constant frequency ultrasonic signals.

14. The invention as defined in claim 10 and having alarm delay means connected to said alarm operating means to prevent the sounding of an alarm for a predetermined time interval after actuating of said alarm operating means.

15. The invention as defined in claim 10 and having system operation delay means operative to enable an operator to turn on the system and then vacate the surveillance area before the system becomes operative.

* * * * *